(12) United States Patent
Numata et al.

(10) Patent No.: US 7,159,171 B2
(45) Date of Patent: Jan. 2, 2007

(54) STRUCTURED DOCUMENT MANAGEMENT SYSTEM, STRUCTURED DOCUMENT MANAGEMENT METHOD, SEARCH DEVICE AND SEARCH METHOD

(75) Inventors: Kenichi Numata, Yokohama (JP); Shigehisa Kawabe, Yokohama (JP); Masao Nukaga, Yokohama (JP); Toshifumi Yamada, Yokohama (JP); Minoru Ikeda, Yokohama (JP); Kazuhiko Higashi, Yokohama (JP); Miho Yamada, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 568 days.

(21) Appl. No.: 10/014,661

(22) Filed: Dec. 14, 2001

(65) Prior Publication Data

US 2003/0159110 A1 Aug. 21, 2003

(30) Foreign Application Priority Data

Aug. 24, 2001 (JP) ............................. 2001-255016

(51) Int. Cl.
*G06N 3/00* (2006.01)

(52) U.S. Cl. ...................................... 715/513
(58) Field of Classification Search ................ 715/500, 715/512, 517, 513, 515, 523, 530; 345/302
See application file for complete search history.

(56) References Cited

U.S. PATENT DOCUMENTS

| | | | | |
|---|---|---|---|---|
| 5,438,512 A | * | 8/1995 | Mantha et al. ............... 715/517 |
| 5,475,805 A | * | 12/1995 | Murata ......................... 715/513 |
| 5,553,216 A | * | 9/1996 | Yoshioka et al. ........... 715/515 |
| 5,752,020 A | * | 5/1998 | Ando ............................. 70/74 |
| 5,878,421 A | * | 3/1999 | Ferrel et al. ................. 707/100 |
| 6,014,663 A | * | 1/2000 | Rivette et al. ................. 707/4 |
| 6,263,332 B1 | * | 7/2001 | Nasr et al. ..................... 707/5 |
| 6,526,410 B1 | * | 2/2003 | Aoyama et al. ............ 707/102 |
| 6,772,141 B1 | * | 8/2004 | Pratt et al. ..................... 707/3 |

* cited by examiner

*Primary Examiner*—Stephen Hong
*Assistant Examiner*—Kyle R. Stork
(74) *Attorney, Agent, or Firm*—Oliff & Berridge, PLC

(57) ABSTRACT

A structured document inputted from a document input unit is decomposed into partial structures to be an editing unit in a document processing unit, and global structural information showing a relation between the partial structures is registered into a relational database. The decomposed partial structure is inputted to an editing unit processing unit, and information of elements as element information and a relation between elements in the partial structure as structural information are registered into the relational database. An ancestor-descendant relation between two elements can be determined easily and speedily by determining an ancestor-descendant relation between the partial structures of the global structural information and an ancestor-descendant relation of the structural information of the ancestor partial structure.

4 Claims, 18 Drawing Sheets

FIG. 3A
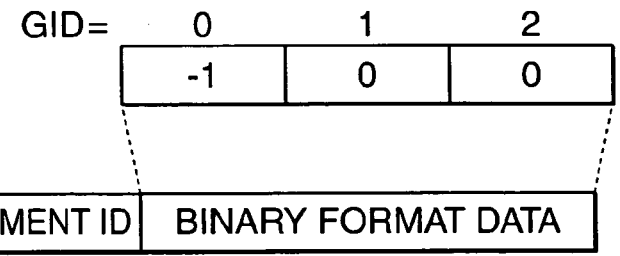
FIG. 3B
GID= 2
| SNo | LNo | ELEMENT NAME | ATTRIBUTE VALUE |
|---|---|---|---|
| 8 | 0 | CONTENTS | ..... |
| 9 | 1 | TEXT | ..... |
| 10 | 2 | PARAGRAPH 1 | ..... |
| 11 | 3 | PARAGRAPH 2 | ..... |
| 12 | 4 | CHART | ..... |
FIG. 3C
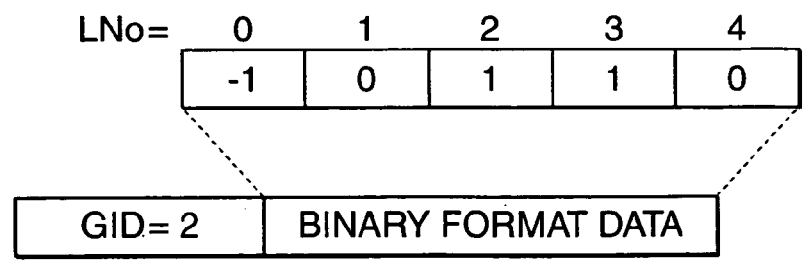

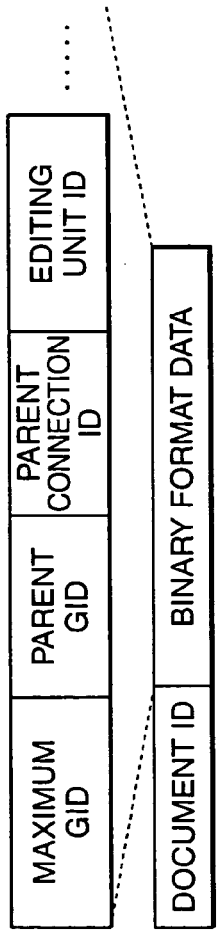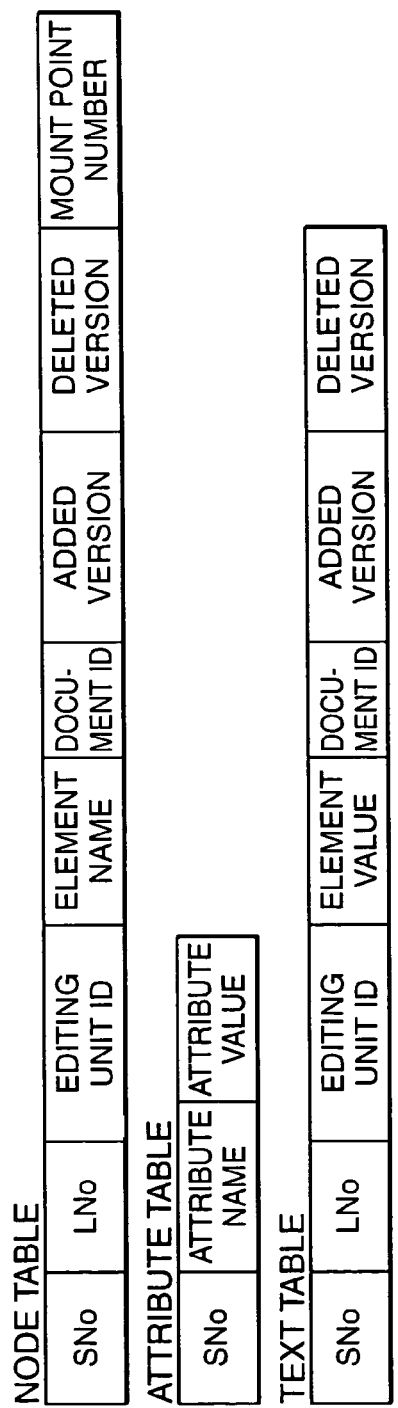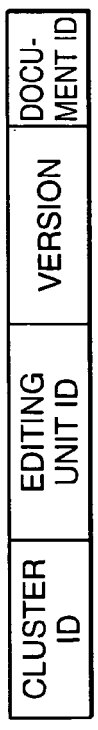
FIG. 4A
FIG. 4B
FIG. 4C
FIG. 4D

FIG. 5A

```
<BOOK ID= "F00000000000000">
<TITLE ID= "F00000000000001">READING= "BOOK TITLE"
<PARA ID= "F00000000000002">BOOK TITLE</PARA>
</TITLE>
<PART ID= "F04000000000000">
<TITLE ID= "F04000000000002">READING= "PART TITLE"
<PARA ID= "F04000000000003">PART TITLE</PARA>
</TITLE>
<CHAPTER ID= "F04010000000000">
<TITLE ID= "F04010000000002">READING= "CHAPTER TITLE"
<PARA ID= "F04010000000003">CHAPTER TITLE</PARA>
</TITLE>
<SECTION ID= "F04020000000000">
<TITLE ID= "F04020000000002">READING= "SECTION TITLE"
<PARA ID= "F04020000000003">SECTION TITLE</PARA>
</TITLE>
<DOCITEM ID= "F04020000000004">
<PARA ID= "F04020000000005">TEXT</PARA>
</DOCITEM></SECTION></CHAPTER></PART></BOOK>
```

FIG. 5B

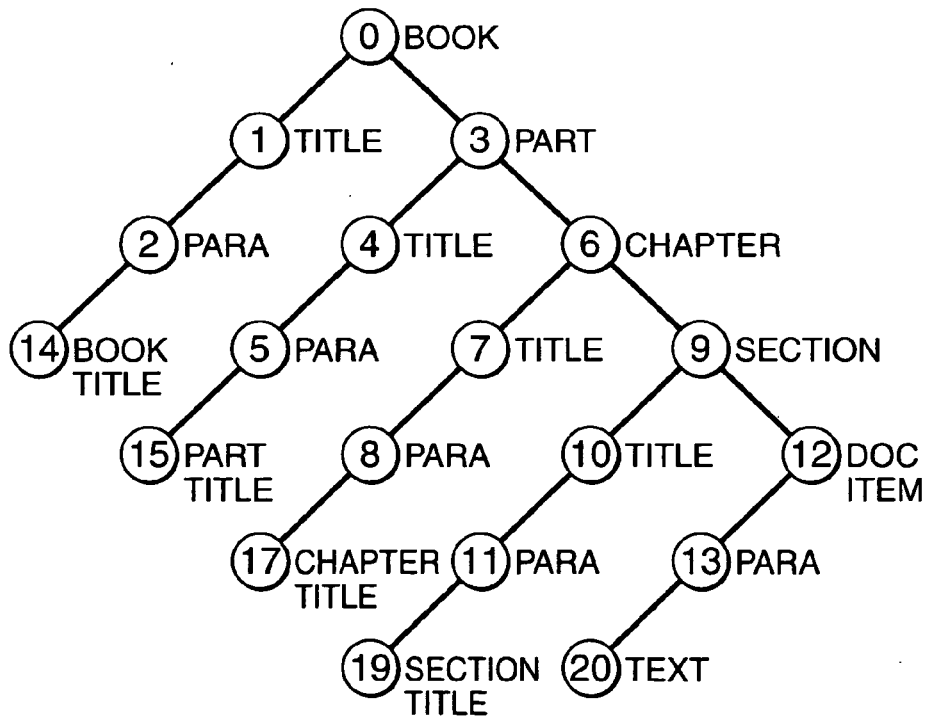

EDITING UNIT ID= 0, GID= 0

```
<BOOK ID= "F00000000000000">
<TITLE ID= "F00000000000001" >READING= "BOOK TITLE"
<PARA ID= "F00000000000002" >BOOK TITLE</PARA>
</TITLE>
<PART ID= F04000000000000 >
<TITLE ID= "F04000000000002" >READING= "PART TITLE"
<PARA ID= "F04000000000003" >PART TITLE</PARA>
</TITLE> &E001;</PART></BOOK>
```

EDITING UNIT ID= 1, GID= 1

```
<CHAPTER ID= F04010000000000 >
<TITLE ID= "F04010000000002" >READING= "CHAPTER TITLE"
<PARA ID= "F04010000000003" >CHAPTER TITLE</PARA>
</TITLE> &E002; </CHAPTER>
```

EDITING UNIT ID= 2, GID= 2

```
<SECTION ID= "F04020000000000" >
<TITLE ID= "F04020000000002" >READING= "SECTION TITLE"
<PARA ID= "F04020000000003" >SECTION TITLE</PARA>
</TITLE>
<DOCITEM ID= "F04020000000004" >
<PARA ID= "F04020000000005" >TEXT</PARA>
</DOCITEM></SECTION>
```

| GID= 0 | | | | GID= 1 | | | | GID= 2 | | | |
|---|---|---|---|---|---|---|---|---|---|---|---|
| 2 | -1 | -1 | 0 | 2 | 0 | 001 | 1 | 2 | 1 | 002 | 2 |

FIG. 10A

NODE TABLE

| SNo | LNo | EDITING UNIT ID | ELEMENT NAME | DOCUMENT ID | ADDED VERSION | DELETED VERSION | MOUNT POINT NUMBER |
|---|---|---|---|---|---|---|---|
| 0 | 0 | 0 | BOOK | 0 | 1 | NULL | 1 |
| 1 | 1 | 0 | TITLE | 0 | 1 | NULL | 0 |
| 2 | 2 | 0 | PARA | 0 | 1 | NULL | 0 |
| 3 | 3 | 0 | PART | 0 | 1 | NULL | 1 |
| 4 | 4 | 0 | TITLE | 0 | 1 | NULL | 0 |
| 5 | 5 | 0 | PARA | 0 | 1 | NULL | 0 |
| 6 | 0 | 1 | CHAPTER | 0 | 1 | NULL | 1 |
| 7 | 1 | 1 | TITLE | 0 | 1 | NULL | 0 |
| 8 | 2 | 1 | PARA | 0 | 1 | NULL | 0 |
| 9 | 0 | 2 | SECTION | 0 | 1 | NULL | 0 |
| 10 | 1 | 2 | TITLE | 0 | 1 | NULL | 0 |
| 11 | 2 | 2 | PARA | 0 | 1 | NULL | 0 |
| 12 | 3 | 2 | DOCITEM | 0 | 1 | NULL | 0 |
| 13 | 4 | 2 | PARA | 0 | 1 | NULL | 0 |

FIG. 10B

ATTRIBUTE TABLE

| SNo | ATTRIBUTE NAME | ATTRIBUTE VALUE |
|---|---|---|
| 0 | ID | F0000000000000 |
| 1 | ID | F0000000000001 |
| 1 | READING | BOOK TITLE |
| 2 | ID | F0000000000002 |
| 3 | ID | F0400000000000 |
| 4 | ID | F0400000000002 |
| 4 | READING | PART TITLE |
| 5 | ID | F0400000000003 |
| 6 | ID | F0401000000000 |
| 7 | ID | F0401000000002 |
| 7 | READING | CHAPTER TITLE |
| 8 | ID | F0401000000003 |
| 9 | ID | F0402000000000 |
| 10 | ID | F0402000000002 |
| 10 | READING | SECTION TITLE |
| 11 | ID | F0402000000003 |
| 12 | ID | F0402000000004 |
| 13 | ID | F0402000000005 |

FIG. 11

TEXT TABLE

| SNo | LNo | EDITING UNIT ID | ELEMENT VALUE | DOCUMENT ID | ADDED VERSION | DELETED VERSION |
|---|---|---|---|---|---|---|
| 14 | 6 | 0 | BOOK TITLE | 0 | 1 | NULL |
| 15 | 7 | 0 | PART TITLE | 0 | 1 | NULL |
| 16 | 8 | 0 | E001 | 0 | 1 | NULL |
| 17 | 3 | 1 | CHAPTER TITLE | 0 | 1 | NULL |
| 18 | 4 | 1 | E002 | 0 | 1 | NULL |
| 19 | 5 | 2 | SECTION TITLE | 0 | 1 | NULL |
| 20 | 6 | 2 | TEXT | 0 | 1 | NULL |

FIG. 14A

EDITING UNIT ID = 0,
CLUSTER ID = 0

| LNo | NODE ORDER | MAXIMUM NODE ORDER |
|---|---|---|
| 0 | 0 | 8 |
| 1 | 1 | 3 |
| 2 | 2 | 3 |
| 3 | 4 | 8 |
| 4 | 5 | 7 |
| 5 | 6 | 7 |
| 6 | 3 | 3 |
| 7 | 7 | 7 |
| 8 | 8 | 8 |

FIG. 14B

EDITING UNIT ID = 1,
CLUSTER ID = 1

| LNo | NODE ORDER | MAXIMUM NODE ORDER |
|---|---|---|
| 0 | 0 | 4 |
| 1 | 1 | 3 |
| 2 | 2 | 3 |
| 3 | 3 | 3 |
| 4 | 4 | 4 |

FIG. 14C

EDITING UNIT ID = 2,
CLUSTER ID = 2

| LNo | NODE ORDER | MAXIMUM NODE ORDER |
|---|---|---|
| 0 | 0 | 6 |
| 1 | 1 | 3 |
| 2 | 2 | 3 |
| 3 | 4 | 6 |
| 4 | 5 | 6 |
| 5 | 3 | 3 |
| 6 | 6 | 6 |

FIG. 14D

VERSION TABLE

| CLUSTER ID | EDITING UNIT ID | VERSION | DOCUMENT ID |
|---|---|---|---|
| 0 | 0 | 1 | 0 |
| 1 | 1 | 1 | 0 |
| 2 | 2 | 1 | 0 |

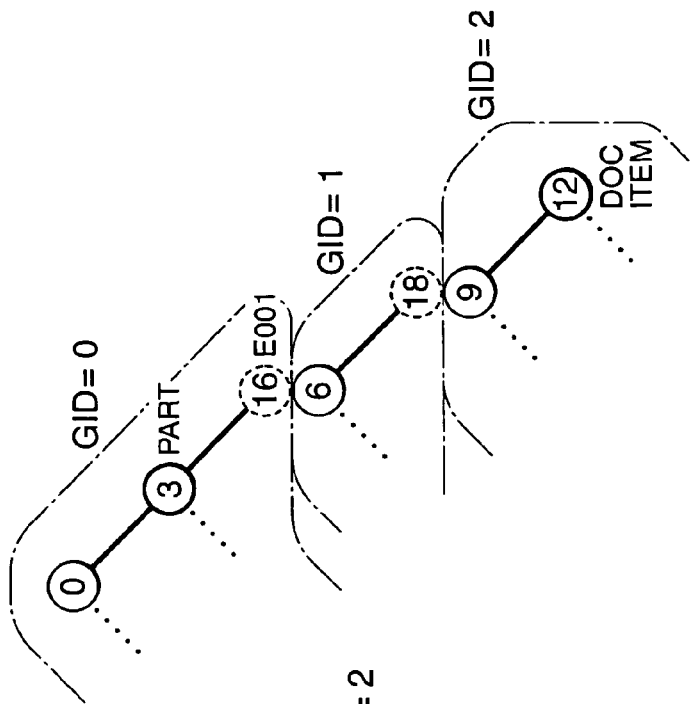
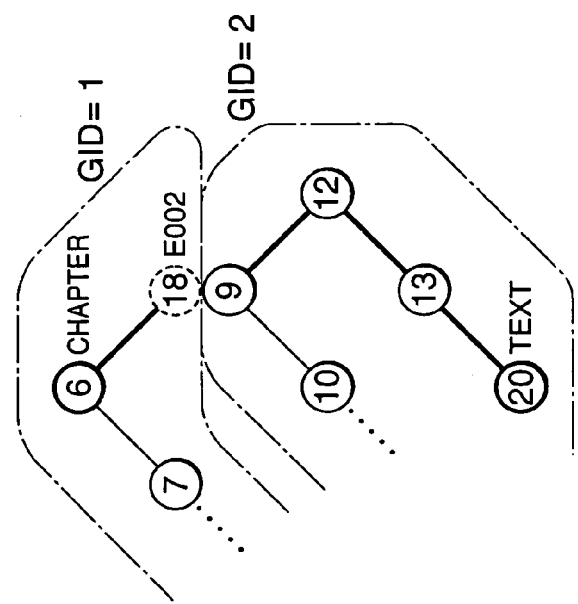
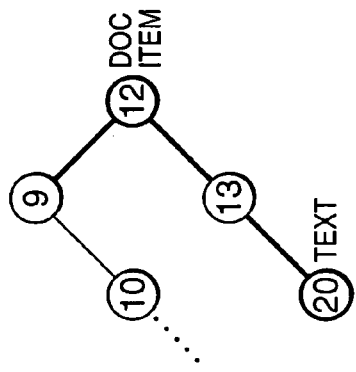
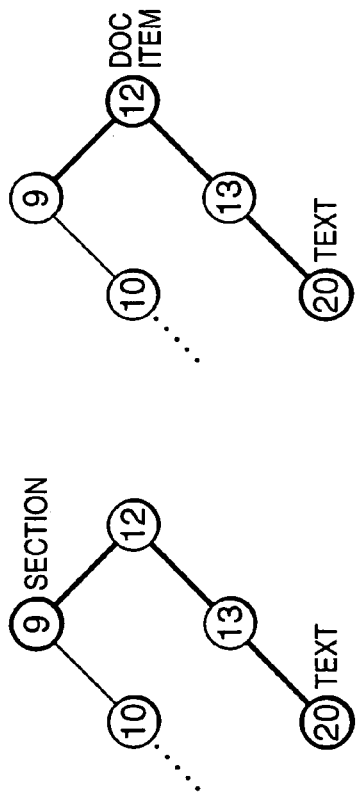

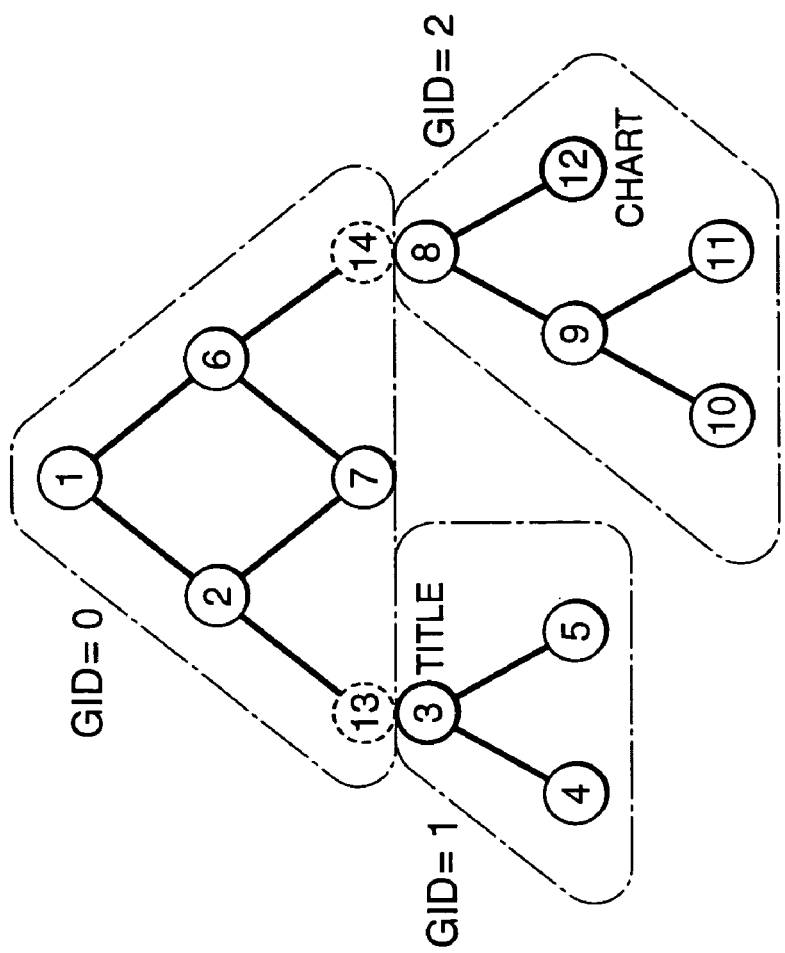
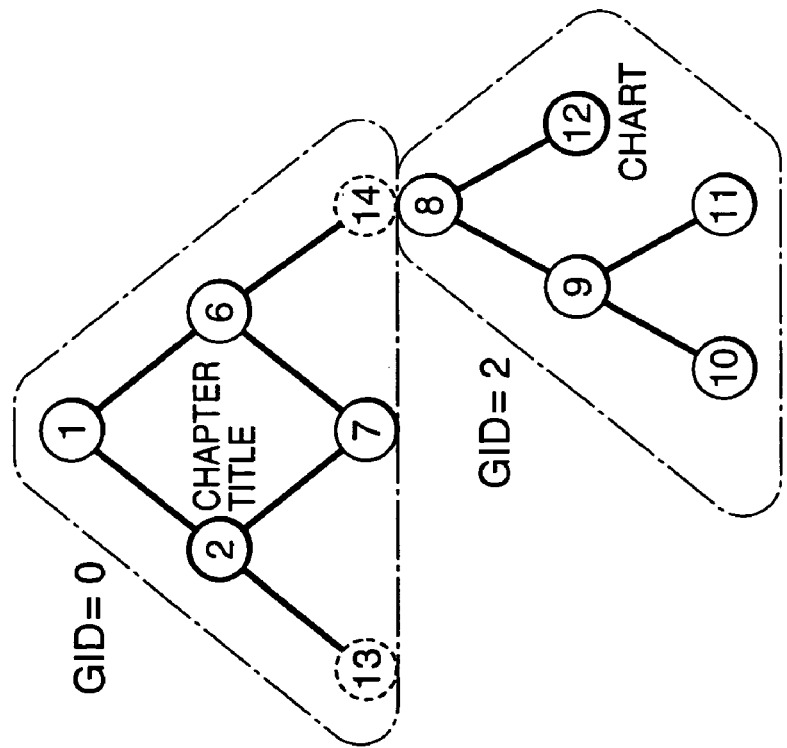

STRUCTURED DOCUMENT MANAGEMENT SYSTEM, STRUCTURED DOCUMENT MANAGEMENT METHOD, SEARCH DEVICE AND SEARCH METHOD

BACKGROUND OF THE INVENTION

1. Field of the Invention

The present invention relates to a structured document management system and a structured document management method which manage a large-scale structured document while enabling editing it, and to a search device and a search method which search an ancestor-descendant relation between elements in a managed structured document.

2. Description of the Related Art

Structured documents such as XML have been stored into a database to be used for searching of the contents or document structures and partial reuse. Generally, in a small document including several pages, one person often creates and edits the document. Even when a structured document is stored into a database, the entire document to be edited is often edited. However, in a large-scale document, plural persons edit the respective parts in charge in the document. Even when a structured document is stored into a database, such a cooperative editing environment must be supplied.

In the case of storing a structured document into a database, the structures in the document have been retained by connecting them by a pointer indicating a parent-child relation between elements in the document, or the structures have been retained using an index table showing the structure. Other several methods are considered, and all the related art methods uniformly retain the entire document in a standardized data format.

When such a related art method for storing a structured document is used and an edited document is stored, the influence will, not infrequently, extend over the entire document. When considering the abovementioned cooperative editing environment, plural persons cannot edit a structured document at the same time in the related art.

When editing affects the entire document, data of the entire document must be restructured each time the document is edited. In a large-scale document, such data restructuring requires enormous processing time, and data restructuring for each editing makes the efficiency very low.

On the other hand, when a structured document is stored into a database in this manner, searching of document structures, particularly searching of an ancestor-descendant relation between two elements is performed frequently. The ancestor-descendant relation shows a relation between elements in which a certain element can be traced to an upper layer element or to a lower layer element. A parent-child relation is the relation in which two elements are directly connected in an upper-lower relation. The ancestor-descendant relation includes the parent-child relation.

Since such searching of an ancestor-descendant relation is performed frequently, it is desirably performed fast. In the related art, it is performed by tracing elements one by one. There are many branches, and in a deep-hierarchy document, the element searching time becomes long. For this reason, there has been desired a method which can efficiently search an ancestor-descendant relation in a large-scale document.

SUMMARY OF THE INVENTION

The present invention has been made in view of the above circumstances and provides a structured document management system and a structured document management method which can efficiently handle a large-scale structured document and can supply an environment in which plural persons can perform editing cooperatively. In addition, the present invention provides a search device and a search method which can efficiently judge an ancestor-descendant relation between elements in a structured document managed by such a structured document management system and a structured document management method so as to search a document structure fast.

According to the present invention, in a structured document management system and a structured document management method for managing a structured document, an inputted structured document is decomposed into plural partial structures in accordance with a setting, and a relation between the partial structures is generated as first structural information. A relation between elements in each of the decomposed partial structures is generated as second structural information, so that a depth-first node order is assigned to each of the elements in the partial structure, and a maximum node order of node orders of elements below the element is associated with the element. The first structural information and the second structural information are retained and the structured document is managed. In this manner, a structured document is decomposed into partial structures to retain the structures as first and second structural information. Each of the partial structures is edited so as to limit the editing influence within the partial structure. When plural persons edit the respective parts in charge at the same time, the influence on other partial structures can be eliminated. In addition, the restructuring process can be performed fast because data restructuring may be performed only within the partial structure even when the structure is changed.

Furthermore, according to the present invention, in a search device and a search method which performs structure searching under a search condition of an ancestor-descendant relation between elements in a structured document, when retaining first structural information showing a relation between plural partial structures obtained by decomposing a structured document in accordance with a setting and second structural information showing a relation between elements in each of the partial structures, an ancestor-descendant relation between the partial structures including elements is first determined by the first structural information. When the partial structures are in an ancestor-descendant relation, an ancestor-descendant relation between an element, which is located somewhere on a path from an ancestor partial structure to a descendant partial structure and is a root of a child partial structure of the ancestor partial structure, and an element included in the ancestor partial structure, is determined by the second structural information. Without tracing the respective elements one by one as in the related art, it is possible to determine fast whether two elements are in an ancestor-descendant relation or not and to efficiently perform searching of a large-scale structured document.

In performing this searching, when the element included in an ancestor partial structure is an element which is a root of the ancestor partial structure, judgment using the second structural information is not performed and only processing using first structural information can determine whether two elements are in an ancestor-descendant relation or not. In addition, when two elements are included in the same partial structure, an ancestor-descendant relation can be determined using second structural information, not first structural information.

BRIEF DESCRIPTION OF THE DRAWINGS

Preferred embodiments of the present invention will be described in detail based on the followings, wherein:

FIGS. 3A to 3C illustrate diagrams of assistance in explaining an example of global structural information, element information, and structural information;

FIGS. 4A to 4D illustrate diagrams of assistance in explaining a specific example of a data structure;

FIGS. 5A and 5B illustrate diagrams of assistance in explaining a specific example of a structured document to be inputted;

FIGS. 10A and 10B illustrate tables of assistance in explaining a specific example of element information (node table and attribute table);

FIG. 11 illustrates a table of assistance in explaining a specific example of element information (text table);

FIGS. 14A to 14D illustrate tables of assistance in explaining a specific example of structural information and a version table;

FIGS. 16A to 16D illustrate diagrams of assistance in explaining an example of a specific operation (in the case of an ancestor-descendant relation) in an example of the search process of an ancestor-descendant relation between two elements; and FIGS. 17A to 17C illustrate diagrams of assistance in explaining an example of a specific operation (in the case of no ancestor-descendant relation) in an example of the search process of an ancestor-descendant relation between two elements.

DESCRIPTION OF THE PREFERRED EMBODIMENTS

Figure 1:
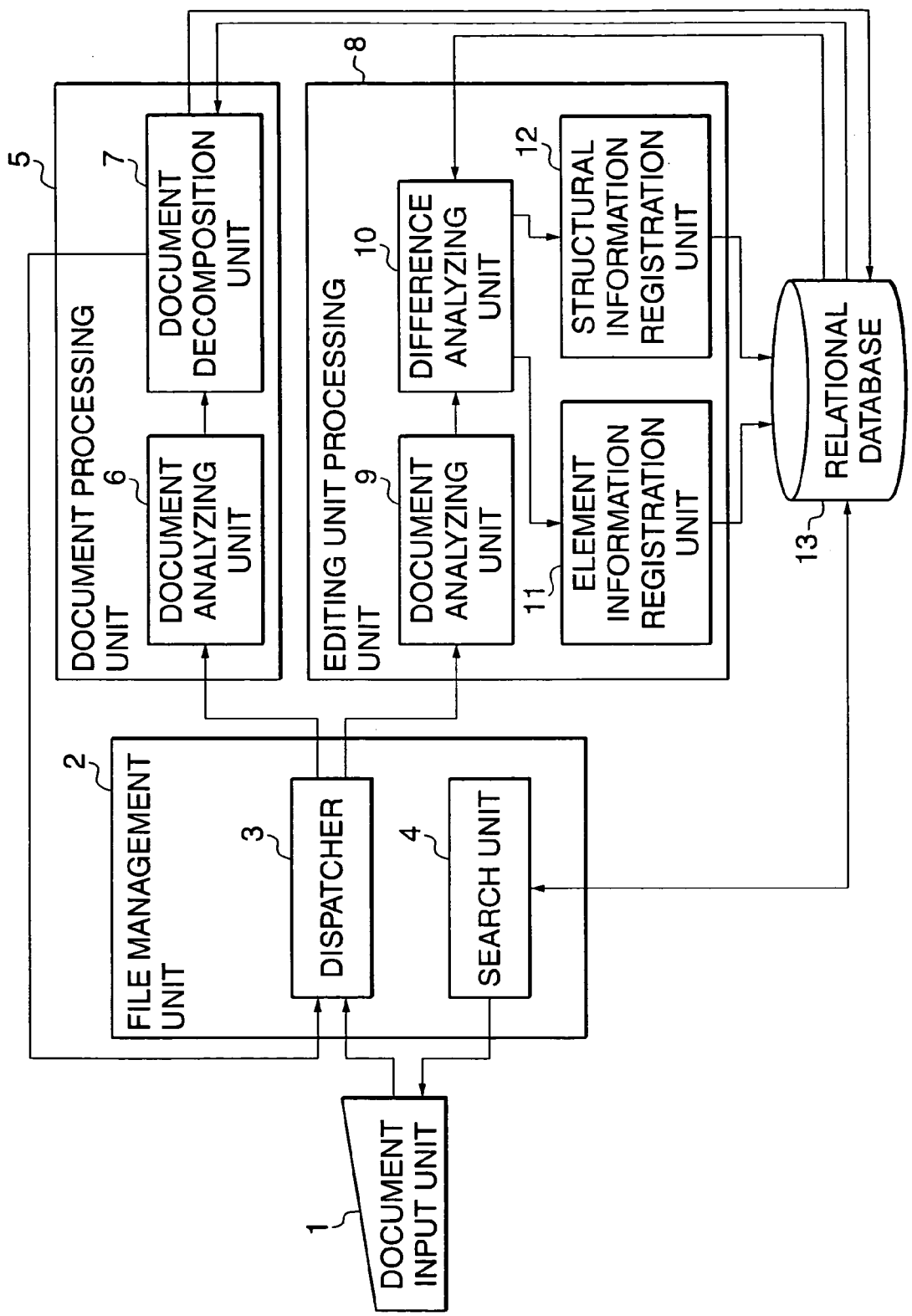
FIG. 1 illustrates a block diagram showing an embodiment of the present invention.

FIG. 1 illustrates a block diagram showing an embodiment of the present invention. In the drawing, the numeral 1 denotes a document input unit, the numeral 2 a file management unit, the numeral 3 a dispatcher, the numeral 4 a search unit, the numeral 5 a document processing unit, the numeral 6 a document analyzing unit, the numeral 7 a document decomposition unit, the numeral 8 an editing unit processing unit, the numeral 9 a document analyzing unit, the numeral 10 a difference analyzing unit, the numeral 11 an element information registration unit, the numeral 12 a structural information registration unit, and the numeral 13 a relational database. The document input unit 1 inputs a structured document to the file management unit 2. At this time, a content type indicating either a structured document before decomposition or a partial structure after decomposition is also inputted here. In addition, the document input unit 1 requests fetching of the structured document or the partial structure of the structured document to the search unit 4 of the file management unit 2 and then receives the partial structure. The result of editing the received structured document or its part structure can be inputted again to the file management unit 2. In addition, the document input unit 1 can request document structure searching with respect to the structured document.

The file management unit 2 receives and sends the structured document or its partial structure from/to the document input unit 1. The file management unit 2 has the dispatcher 3 and the search unit 4. The dispatcher 3 receives the structured document or its partial structure sent from the document input unit 1, and then sends the structured document before being decomposed into partial structures in accordance with its content type to the document processing unit 5. When the dispatcher 3 receives the decomposed partial structure, it sends the partial structure to the editing unit processing unit 8. The dispatcher 3 receives the partial structure decomposed by the document processing unit 5, and then sends it to the editing unit processing unit 8.

The search unit 4 fetches from the relational database 13 the structured document or its partial structure requested from the document input unit 1, and then sends it to the document input unit 1. The search unit 4 receives various search requests to relational database 13, and then sends back the search result. In particular, the search unit 4 can perform document structure searching, and at this time, judges an ancestor-descendant relation between elements according to the search method of the present invention.

The document processing unit 5 analyzes the structured document sent from the dispatcher 3 of the file management unit 2, and decomposes it into partial structures. The document processing unit 5 has the document analyzing unit 6 for analyzing the structured document and the document decomposition unit 7 for decomposing the structured document into plural partial structures in accordance with a setting read from the relational database 13. In a large-scale structured document, the decomposed partial structure is an editing unit. The decomposed partial structure to which a content type indicating it is the decomposed partial structure is added is inputted to the file management unit 2. A relation between the partial structures as global structural information (first structural information) is registered as a record into the relational database 13.

The editing unit processing unit 8 stores, into the relational database 13, information of an element in the partial structure as element information and a relation between elements as structural information for the partial structure sent from the file management unit 2. The editing unit processing unit 8 has the document analyzing unit 9, the difference analyzing unit 10, the element information registration unit 11, and the structural information registration unit 12. The document analyzing unit 9 analyzes the partial structure sent from the file management unit 2.

In this example, the edited partial structure is provided for use of version management by storing a difference between the partial structure after editing and the partial structure before editing into the relational database 13, and the difference analyzing unit 10 as the structure therefor is provided. The difference analyzing unit 10 follows the result analyzed by the document analyzing unit 9, and then, extracts a difference between the partial structure before editing and the partial structure after editing retained by the relational database 13 which is to be registered into the relational database 13. In the case of the partial structure of a new structured document, the entire partial structure is to be registered into the relational database 13. When not performing difference management, the difference analyzing unit 9 is unnecessary.

The element information registration unit 11 registers, into the relational database 13, a record in which the attribute information and the contents of each of the elements in the partial structure are field values. An element which is judged to be added by difference extraction by the difference analyzing unit 10 is newly registered. An element which is judged to be changed or deleted is deleted. The deleting process may actually delete the record. For example, in the case of performing version management, information that it is deleted may be added and left.

The structural information registration unit 12 generates a relation between elements of the partial structure sent from the file management unit 2 as structural information (second structural information) and registers it into the relational database 13. When the partial structure is edited, the structural information of the partial structure is restructured and newly registered. The structural information must be restructured when editing is performed in this manner. However, each of the decomposed partial structures is edited, and can be updated without affecting other partial structures. The document structure of the entire document needs not to be restructured. In performing version management, each time the partial structure is edited, the structural information may be restructured to correspond with the global structural information.

The relational database 13 is a typical relational database, stores, as a record, element information of elements of the structured document, global structural information showing a relation between the partial structures, and structural information showing a relation between elements in the partial structure, and retains the structured document by these pieces of information. In order to enhance their search function, the global structural information and the structural information may be stored as binary format data into a field in the record. These data may be naturally registered into another database.

Figure 2A:
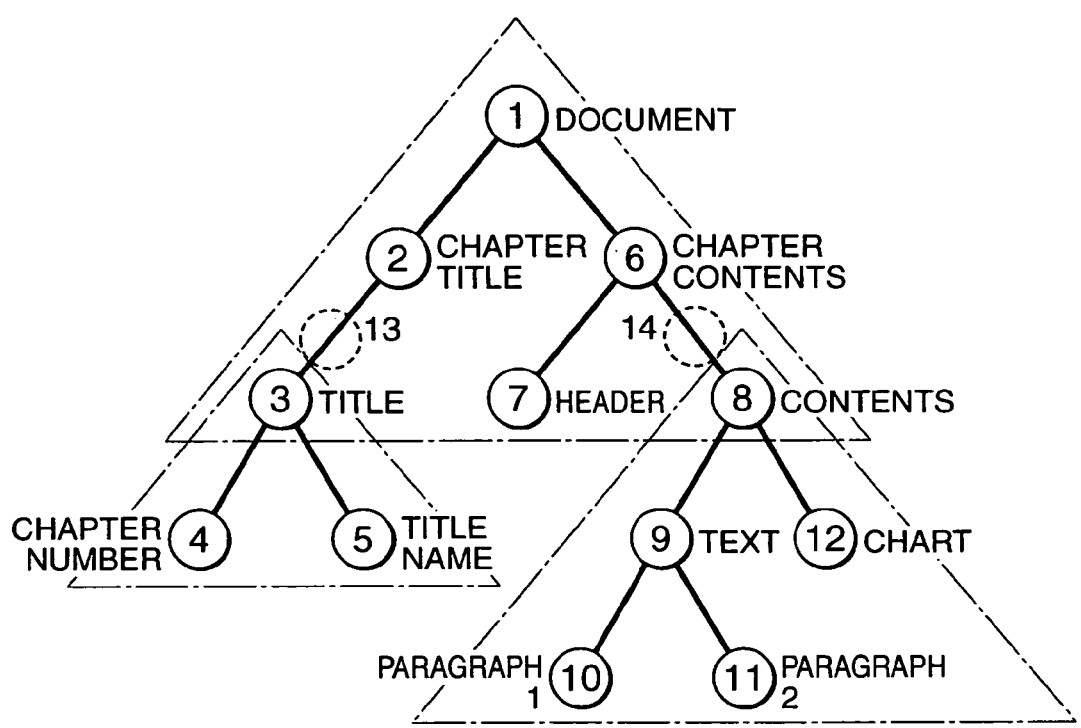
FIGS. 2A and 2B illustrate diagrams of assistance in explaining an example of the structure of a structured document.
Figure 2B:
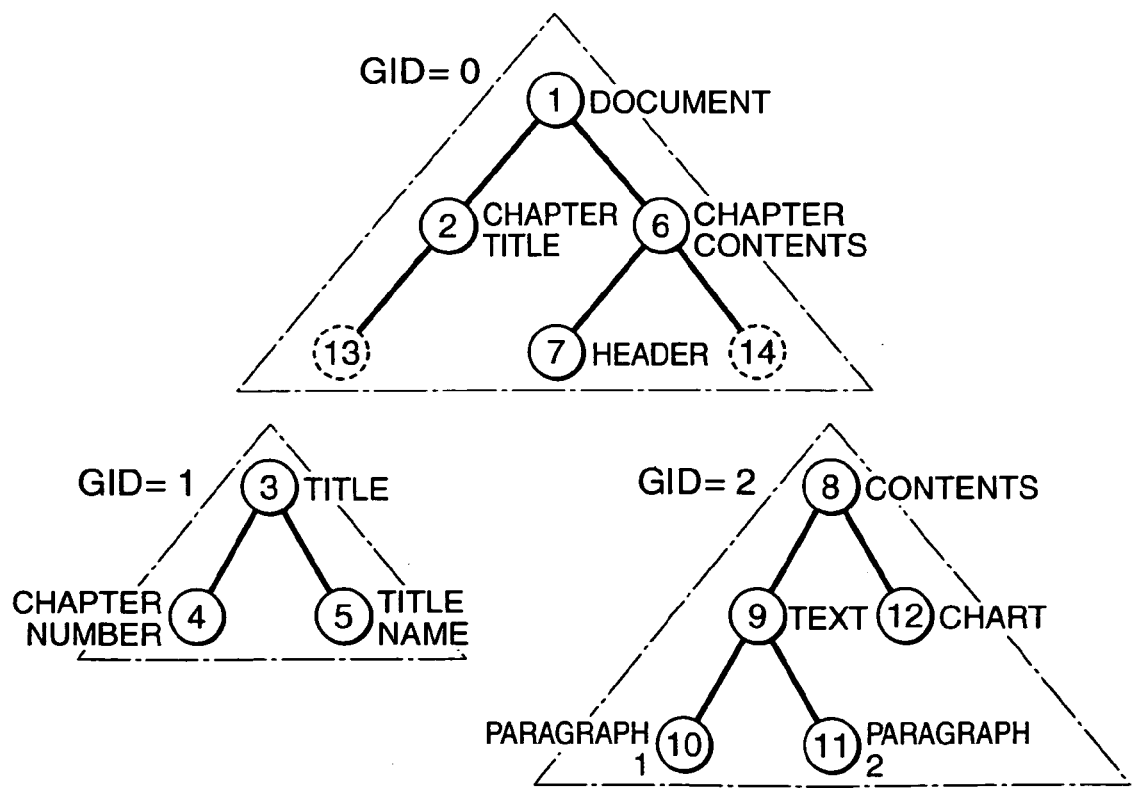

An example of a general operation of the abovementioned embodiment of the present invention will be described. FIGS. 2A and 2B illustrate diagrams of assistance in explaining an example of the structure of a structured document. FIGS. 3A to 3C illustrate diagrams of assistance in explaining an example of global structural information, element information, and structural information. As shown in FIG. 2A, consider here the case where a five-hierarchy structured document is inputted. Each of the elements is indicated by a circle, and the number indicates a sequence number (SNo) for specifying the elements.

The document input unit 1 inputs a structured document (and a content type) as shown in FIG. 2A. The dispatcher 3 responds to the content type of the inputted structured document and sends the inputted structured document to the document processing unit 5.

In the document processing unit 5, the document analyzing unit 6 analyzes the structured document, and the document decomposition unit 7 decomposes the document into plural partial structures in accordance with a setting read from the relational database 13. For example, in FIG. 2A, the structured document is decomposed for each of the parts indicated by a triangle. This provides three partial structures, as shown in FIG. 2B. The decomposed partial structures are sent again to the dispatcher 3 of the file management unit 2.

When decomposition into partial structures is performed in this manner, global structural information showing a relation between the partial structures is generated to be stored into the relational database 13. The three partial structures decomposed as shown in FIG. 2B are respectively assigned 0, 1 and 2 as a global ID (abbreviated as GID). When a parent GID for simplifying the explanation as information showing the structure is retained, data arranging parent GIDs of the partial structures as shown in FIG. 3A can be obtained. Such data is directly embedded as a field in the record as, e.g., memory image, and is then stored into the relational database 13 together with a document ID for uniquely specifying a document.

When the document is decomposed into partial structures, a linking element at the top of the lower partial structure is included in the upper partial structure. In the example shown in FIGS. 2A and 2B, the element having SNo of 3 or 8 extends over plural partial structures. In such a case, a dummy element is added to the upper partial structure. In this example, to the partial structure having GID of 0, there are virtually added the element having SNo of 13 in place of the element having SNo of 3, and the element having SNo of 14 in place of the element having SNo of 8. The added dummy element is called a mount point.

The dispatcher 3 which has received the partial structure decomposed by the document decomposition unit 7, in turn, sends the partial structure to the editing unit processing unit 8. In the editing unit processing unit 8, the document analyzing unit 9 analyzes the partial structure to send it to the difference analyzing unit 10. Since it is a new structured document, the difference analyzing unit 10 sends the partial structure to the element information registration unit 11 and the structural information registration unit 12.

The element information registration unit 11 registers information on the elements in the partial structure as element information into the relational database 13. For example, in the case of the partial structure having GID of 2 shown in FIG. 2B, information on the elements having SNo of 8 to 12 is registered into the relational database 13. FIG. 3B shows an example of the element information. In this example, together with SNo specifying the elements, a local number (LNo) specifying the element in the partial structure, an element name, and an attribute value are field values. The field structure is optional, and version information may be included. Although this element information does not include a parent-child relation between the elements, fast searching with the filed values such as attribute value searching is possible. The element information can correspond with the later-described structural information by LNo or SNo.

The structural information registration unit 12 generates the structural information showing a relation between the elements in the partial structure. The structural information may be of any data structure. In the example shown in FIG. 3C, the structural information is structured as data arranging parent LNos of the elements. In addition, in this example, the memory image of the structural information is directly embedded as the field in the record, and is then stored into the relational database 13 together with GID for uniquely specifying a partial structure.

FIGS. 3B and 3C show only the element information and structural information in the partial structure having GID of 2. Similar element information and structural information are created for the partial structures having GID of 0 and 1, and are registered into the relational database 13. The data structures of the global structural information, the element information, and the structural information shown in FIGS. 3A to 3C are an example, and can be optionally arranged at designing of the relational database 13. The later-described specific example uses data structures which are partly different from the data structures shown in FIGS. 3A to 3C.

When, as described above, the structured document is decomposed into partial structures which are registered into the relational database 13, the document can be edited with the partial structure as the editing unit. The document input unit 1 requests fetching of the partial structure to the file management unit 2. The search unit 4 reads the partial structure to be edited from the relational database 13 to output it to the document input unit 1. The document input unit 1 edits the partial structure, and then inputs it again to the file management unit 2.

The edited partial structure (and the content type) inputted to the file management unit 2 is sent to the editing unit processing unit 8 by the dispatcher 3. In the editing unit processing unit 8, the document analyzing unit 9 analyzes the partial structure to send it to the difference analyzing unit 10. The difference analyzing unit 10 compares the partial structure before editing registered into the relational database 13 with the partial structure after editing received from the document analyzing unit 9, and then extracts a difference therebetween. Element editing includes changing of the contents or attribute vales, new addition, and element deletion. The element information registration unit 11 registers the element information of the newly added element into the relational database 13. At this time, version information at addition may be added. For the deleted element, the record is deleted, or deletion information (e.g., old version information) is added to the element information corresponding to the element. For change, the element information before editing is deleted, and the element information after editing may be added.

The structural information corresponding to the edited partial structure is restructured in the structural information registration unit 12. In this case, the structural information to be restructured may be within the partial structure. The number of processes is much smaller as compared with the case of restructuring the structural information of the entire structured document. In addition, this will not affect other partial structures, and restructuring can be performed without any problem while other persons edit other partial structures.

The document input unit 1 can request document structure searching to the file management unit 2. The search unit 4 which has received the request searches the document having a document structure adapted to the search condition from the structured document registered into the relational database 13, and then sends back the search result to the document input unit 1. For the document structure searching, in many cases, an ancestor-descendant relation between two elements is searched. As described above, the structured document is decomposed into partial structures to provide global structural information showing a relation between partial structures and structural information showing a relation between elements in the partial structures. Therefore, a large-scale structured document with many hierarchies and branches can be easily searched.

In searching of an ancestor-descendant relation between elements existing in the same partial structure, the structural information of the partial structure in which the elements exist may be referred. Because of the partial structure, the number of the elements is small and the ancestor-descendant relation can be searched fast. The searching method of an ancestor-descendant relation in the partial structure is optional, and various document structure searching methods which have been used can be employed.

When two elements to be searched for the relation exist in different partial structures, an ancestor-descendant relation between partial structures in which the elements exist is searched. In this searching, the global structural information may be referred. The number of the partial structures is much smaller than that of the elements, and this searching can be executed fast. In the searching method in this case, when each of the partial structures is considered to be one element, various document structure searching methods which have been used can be employed.

When the partial structures in which the elements exist are in an ancestor-descendant relation, an ancestor-descendant relation between an element (that is, a mount point) which is located on a path from the ancestor partial structure to the descendant partial structure and is the root of the child partial structure of the ancestor partial structure and an element included in the ancestor partial structure is determined by the structural information of the ancestor partial structure.

In the example shown in FIG. 2A, when an ancestor-descendant relation between the element of SNo=6 and the element of SNo=9 is determined, the partial structure of GID=0 including the element of SNo=6 and the partial structure of GID=2 including the element of SNo=9 are in an ancestor-descendant relation. An ancestor-descendant relation between the element which is the root of the partial structure of GID=2 (SNo=8 or SNo=14) and the element of SNo=6 is checked using the structural information of the partial structure of GID=0. Since they are in an ancestor-descendant relation, SNo=6 and SNo=9 are judged to be in an ancestor-descendant relation.

For the elements in the partial structure of GID=0, in the case of the element of SNo=2, a relation between the partial structures is in an ancestor-descendant relation. However, since a relation between SNo=2 and SNo=14 is not in an ancestor-descendant relation, the elements of SNo=2 and SNo=9 are judged not to be in an ancestor-descendant relation.

In this manner, after an ancestor-descendant relation between the partial structures is checked, a relation in the ancestor partial structure is only checked to check an ancestor-descendant relation between two elements. In a large-scale document having an enormous number of elements, the related art searching method which traces elements one by one is a process taking long time for such searching of an ancestor-descendant relation. According to the present invention, an ancestor-descendant relation can be easily searched for a short time.

When the element included in the ancestor partial structure is an element which is the root of the partial structure, an ancestor-descendant relation of the partial structures may be only searched. The reason is that the element which is apparently the root of the partial structure is the parent of an element in any partial structure existing below the partial structure. The subsequent judgment is not performed to make the search process faster.

The abovementioned operation will be described in greater detail using a specific example. FIGS. 4A to 4D illustrate diagrams of assistance in explaining a specific example of a data structure. In the specific example explained below, the data structure as shown in FIGS. 4A to 4D is used to register global structural information, element information, and structural information into the relational database 13 for use.

As shown in FIG. 4A, the global structural information has information including a maximum GID, a parent GID, a parent connection ID, and an editing unit ID for each of the partial structures. The data for each of the partial structures are arranged in the order of GID. The GID is an ID sequentially assigned to a partial structure searched in depth-first and left-first order from a root node. An assigning method the GID is the same as that of the later-described node order assigned to each of the elements of the structural information in a partial structure. In place of explanation of the GID assigning method, the later-described node order assigning method will be explained. The maximum GID is a maximum GID of GIDs of partial structures below the partial structure. Since the GID is assigned in the depth-first order, the GID of the partial structure to the maximum GID are assigned to a partial structure below the partial structure. It is ensured that a GID larger than the maximum GID does not exist below the partial structure. The parent GID is a GID of a partial structure which is the parent of the partial structure. The parent connection ID indicates that in the example shown in FIG. 2B, to what elements virtually added in the partial structure having GID of 0 the partial structure having GID of 1 is connected. The editing unit ID is an ID for uniquely identifying the partial structure in the entire system. These pieces of information are arranged by the number of GIDs to be one field value in the record in a binary format, and can add a field such as a document ID so as to be retained into the relational database 13. The data format at storing is naturally optional.

As shown in FIG. 4B, the element information has a node table, an attribute table, and a text table. Of the elements, the element as a leaf has text table information, and other elements have information of a node table and an attribute table. The node table and the attribute table may be one table, and modification is optional.

The node table has fields such as the SNo, LNo, editing unit ID, element name, document ID, added version information, deleted version information, and mount point number. SNo is an ID uniquely assigned to an element in the entire system. LNo is an ID uniquely assigned to an element in the partial structure. The LNo is irrespective of a document structure. The editing unit ID is an ID for specifying a partial structure including an element. The element name is an element name in a document. The document ID is an ID for specifying a document including the element. The added version information is information showing the version adding the element. At new registration of a document, it is 1. The deleted version information is information showing the version immediately before the element is deleted. At new registration of a document, it is NULL, and it is 1 when the element is deleted by the first update. The mount point number indicates the number of mount points connected to the lower position (the descendant) of the element. The mount point is a dummy element added to the upper partial structure of an element extending over plural partial structures, as described above. In the partial structure having GID of 0 shown in FIG. 2B, the mount point number of the element having SNo of 1 is 2. The attribute table has fields such as the SNo, attribute name, and attribute value. The SNo is similar to the node table. The attribute name is a name provided to the attribute of the element, and its value is stored as the attribute value.

The text table has fields such as the SNo, LNo, editing unit ID, element value, document ID, added version information, and deleted version information. The element value stores the document contents possessed by an element which is a leaf. In the example shown in FIG. 2B, an element virtually added to the partial structure having GID of 0 is an element which is a leaf in the partial structure. In this case, a connection ID is stored as the element value. Other fields are as described above.

As shown in FIG. 4C, the structural information arranges data such as the LNo, node order, and maximum node order for each of the elements in the partial structure. The LNo is as described above. The node order is an ID sequentially assigned to an element searched in the depth-first and left-first order from an element which is the root in the partial structure. The maximum node order is a maximum node order of node orders of elements below the element in the partial structure. Since the node order is assigned in the depth-first order, an ID from the node order to the maximum node order of the element is assigned to elements below the element. It is ensured that an ID larger than the maximum node order does not exist below the element. These pieces of information are arranged by the number of the elements (including the virtually provided elements) existing in the partial structure to become one field value in the record in a binary format, and can be added a field such as a cluster ID so as to be retained by the relational database 13. The data format at storing is naturally optional. The cluster ID is an ID for specifying a partial structure like the abovementioned editing unit ID. The structural information is restructured when the version is changed due to document editing. Each time the version is changed, a new cluster ID is provided. When not performing the version management, the cluster ID may be the editing unit ID.

As shown in FIG. 4D, the version table has the cluster ID, editing unit ID, version information, and document ID. The version table connects the editing unit ID provided to the partial structure in the global structural information to the structural information showing the document structure in a partial structure which is different for each version. Information showing the newest version of each of the documents is retained separately. When the newest document is fetched, the version table can be searched from the newest version information to obtain the newest structural information of the partial structures. For the attribute information, when a record in which the deleted version information is NULL is fetched as described above, the newest element information can be fetched. When not performing the version management, the present invention can be configured without providing the version table.

FIGS. 5A and 5B illustrate diagrams of assistance in explaining a specific example of a structured document to be inputted. The structured document as shown in FIG. 5A described by XML is inputted from the document input unit 1. When the document structure of the structured document is tree expressed, it is as shown in FIG. 5B. In FIG. 5B, a circle indicates an element, and the number therein indicates SNo. Missing SNo is assigned to the mount point, as described later.

When such a structured document is inputted from the document input unit 1, the dispatcher 3 sends the inputted structured document to the document processing unit 5. In the document processing unit 5, the document analyzing unit 6 analyzes the structured document, and the document decomposition unit 7 decomposes the document into plural partial structures in accordance with a setting read from the relational database 13. It decomposes the document by CHAPTER and SECTION.

Figures 6A, 6B:
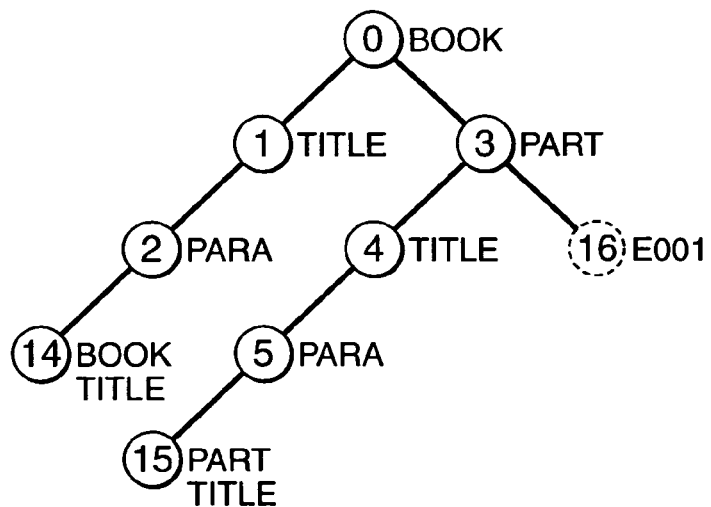
FIGS. 6A and 6B illustrate diagrams of assistance in explaining a specific example (the editing unit ID=0) of a document for each decomposed partial structure.
Figures 7A, 7B:
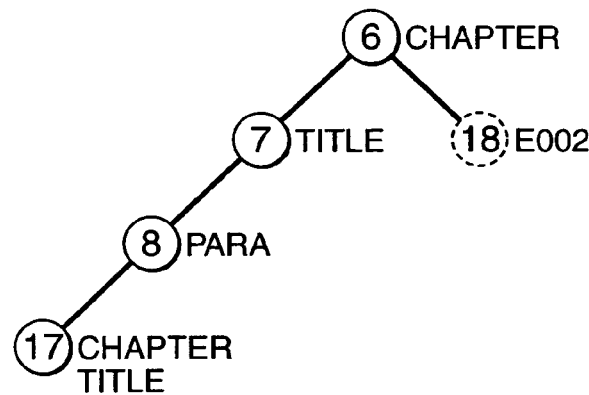
FIGS. 7A and 7B illustrate diagrams of assistance in explaining a specific example (the editing unit ID=1) of a document for each decomposed partial structure.
Figures 8A, 8B:
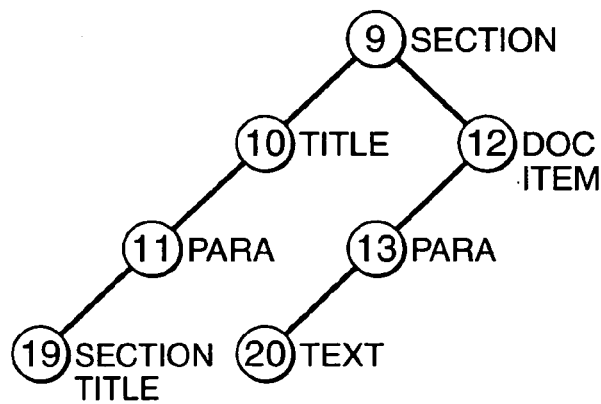
FIGS. 8A and 8B illustrate diagrams of assistance in explaining a specific example (the editing unit ID=2) of a document for each decomposed partial structure.

FIGS. 6 and 8 illustrate respectively diagrams of assistance in explaining a specific example of the document for each of the decomposed partial structures. In the drawings, the description of the decomposed document is indicated as (A), and the tree expression of the decomposed partial structure is indicated as (B). In the following description, the partial structure shown in FIGS. 6A and 6B has the editing unit ID=0, the partial structure shown in FIGS. 7A and 7B has the editing unit ID=1, and the partial structure shown in FIGS. 8A and 8B has the editing unit ID=2. Aside from the editing unit ID, a GID is assigned to each of the partial structures. Here, the partial structure shown in FIGS. 6A and 6B is assigned GID=0, the partial structure shown in FIGS. 7A and 7B is assigned GID=1, and the partial structure shown in FIGS. 8A and 8B is assigned GID=2.

In the partial structure shown in FIGS. 6A and 6B, the virtual element (SNo=16) corresponding to the element of SNo=6 shown in FIG. 5B is added for decomposition into partial structures. In the document description shown in FIG. 6A, the description part moved to another partial structure by decomposition is replaced by the description "&E000;". This is a connection ID. The partial structure shown in FIG. 7 is similar, and the virtual element (SNo=18) corresponding to the element of SNo=9 shown in FIG. 5B is added. In the document description shown in FIG. 7A, the description part moved to another partial structure by decomposition is replaced by the connection ID "&E002;". The replaced element is a mount point.

Figures 9A, 9B:
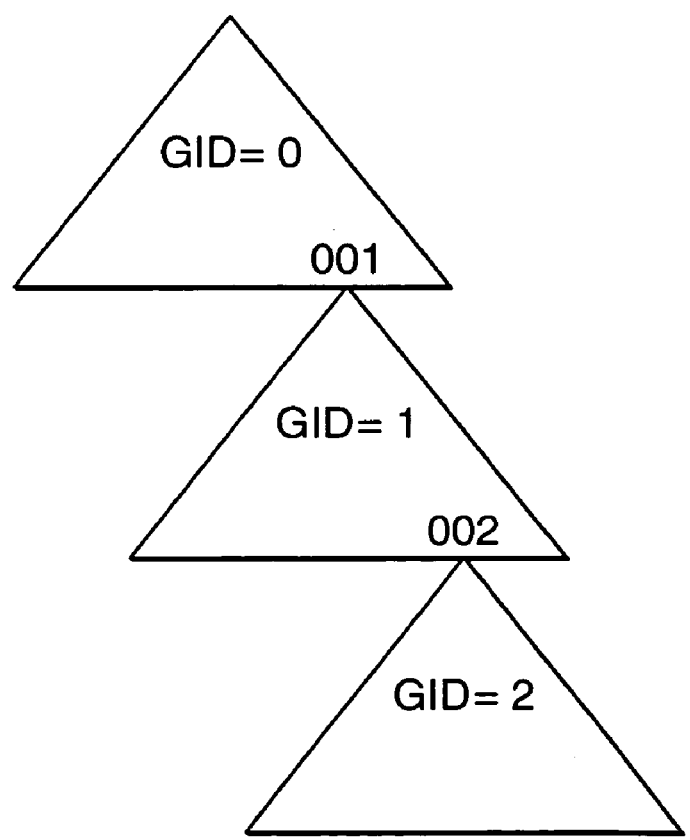
FIGS. 9A and 9B illustrate diagrams of assistance in explaining a specific example of global structural information.

FIGS. 9A and 9B illustrate diagrams of assistance in explaining a specific example of the global structural information. When the structured document is decomposed into partial structures as described above, a relation between the partial structures is found at this point. The tree expression between the partial structures is shown in FIG. 9B. In FIG. 9B, each of the partial structures is indicated by a triangle. The inside of the triangle indicates the connection ID of the mount point together with GID.

The relation between the partial structures is registered as global structural information into the relational database 13. In this specific example, the global structural information is as shown in FIG. 9A. The partial structure of GID=1 is connected to the mount point (SNo=16) in the partial structure of GID=0. Only the numeral value part of the connection ID ("&E001;") is included as a parent connection ID in the global structural information. The partial structure of GID=2 is similar. Only the numeral value part of the connection ID ("&E002;") of the mount point (SNo=18) in the partial structure of GID=1 as a parent connection ID is included as a parent connection ID in the global structural information.

Such global structural information is added a document ID and is then registered into the relational database 13. At this time, it is stored as a field value in a binary format. The search performance can be enhanced.

The descriptions of the decomposed partial structures shown in FIGS. 6A, 7A, and 8A are returned to the file management unit 2. The dispatcher 3 of the file management unit 2 sends these descriptions of the decomposed partial structures to the editing unit processing unit 8. In the editing unit processing unit 8, the document analyzing unit 9 analyzes the description of each of the partial structures to send it to the difference analyzing unit 10. Because of a new structured document, the difference analyzing unit 10 sends the analyzing result of the partial structure by the document analyzing unit 9 to the element information registration unit 11 and the structural information registration unit 12.

The element information registration unit 11 generates element information from the description of each of the partial structures. The element information registration unit 11 generates a text table for the element corresponding to the leaf in accordance with the data structure of the element information shown in FIG. 4B, and generates a node table and an attribute table for other elements. FIGS. 10 and 11 respectively illustrate diagrams of assistance in explaining a specific example of the element information. FIG. 10A shows a node table, FIG. 10B shows an attribute table, and FIG. 11 shows a text table. SNos have been already assigned for explanation in FIGS. 6A and 6B to 8A and 8B. The description of each of the partial structures is actually inputted to the editing unit processing unit 8 and is analyzed, whereby SNos are assigned in the element appearance order. LNos are assigned to the partial structures irrespective of the document structure. To the added version, 1 is stored at new registration. To the deleted version, 'NULL' is stored at new registration. The mount point number is '1' for the elements of SNo=0, 3 and 6 in which the virtual elements (SNo=12 and 14) are connected below them, and is 0 for other elements. Such element information is registered into the relational database 13.

Figure 12:
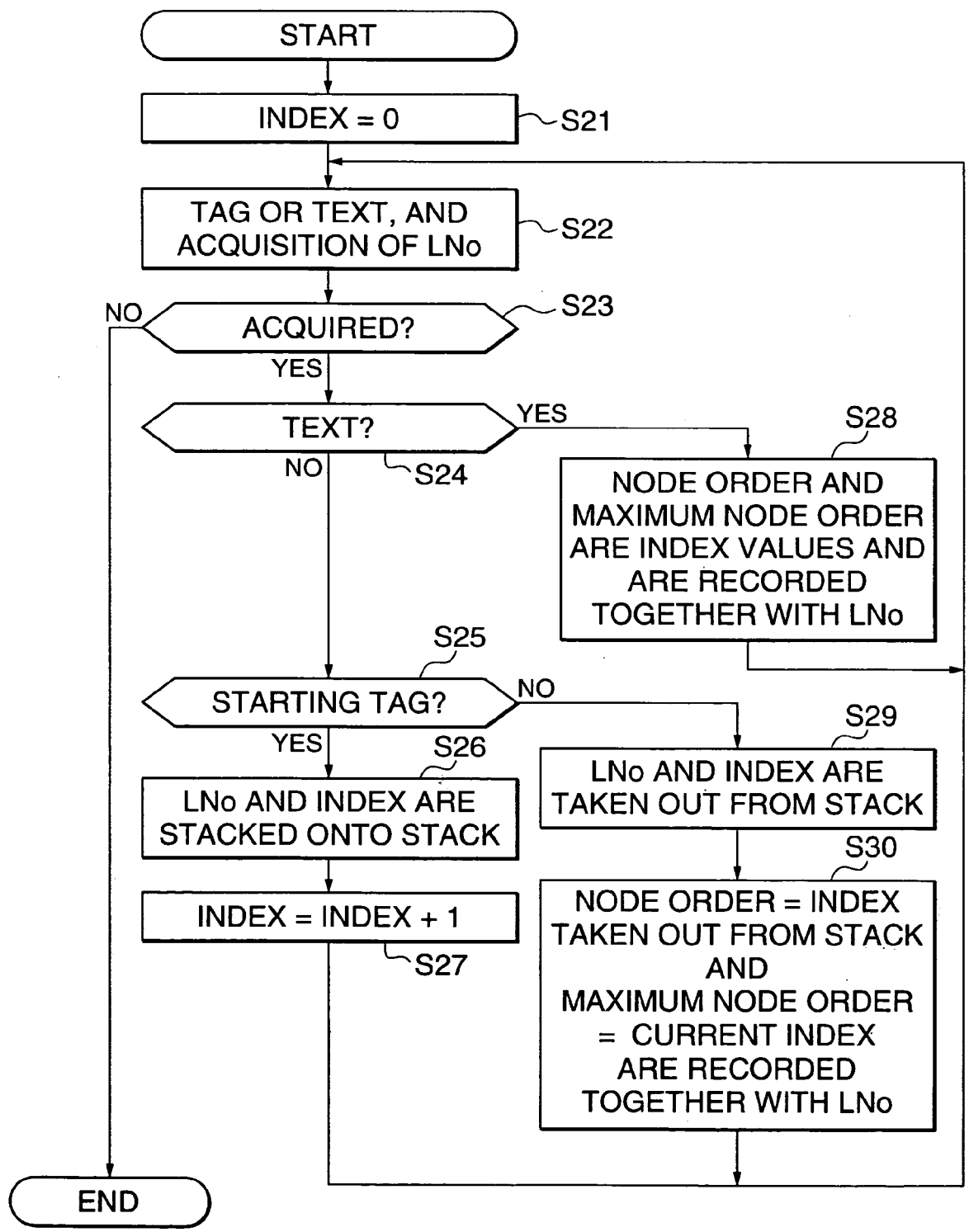
FIG. 12 illustrates a flowchart showing an example of a process for generating structural information.

The structural information registration unit 12 generates structural information showing a relation between elements in the partial structure. The structural information registration unit 12 determines and stores an LNo, a node order, and a maximum node order of each of the elements in accordance with the data structure of the structural information shown in FIG. 4C. FIG. 12 illustrates a flowchart showing an example of a process for generating structural information. Here, there will be explained that each time a tag and text of XML are sequentially cut out, each process therefor is performed, and an LNo is provided separately. In order to advance the process, a stack for storing an LNo and an index value is used.

In S21, an index is set to 0 as initial setting. In S22, cutting-out of a tag or text is detected to acquire an LNo. In S23, whether the tag or text exists or not is judged, and when the tag or text cannot be cut out and the description of the partial structure is terminated, the process is ended.

In S24, whether the cut-out element is a text or not is judged. When the cut-out element is a tag, whether it is a starting tag or ending tag is judged in S25. When the cut-out element is a starting tag, the LNo acquired in S22 and the current index are stacked onto the stack in S26. In S27, the index value is increased by 1.

When the cut-out element is a text, in S28, the current index values are a node order and a maximum node order, and the LNo, the node order, the maximum node order are stored in the position of the structural information corresponding to the LNo acquired in S22.

When the cut-out element is an ending tag, the LNo and the index are taken out from the stack in S29. In S30, the index value taken out as the node order from the stack and the current index value as the maximum node order are set, and then, the LNo, the node order, the maximum node order are stored in the position of the structural information corresponding to the LNo taken out from the stack.

Figure 13:
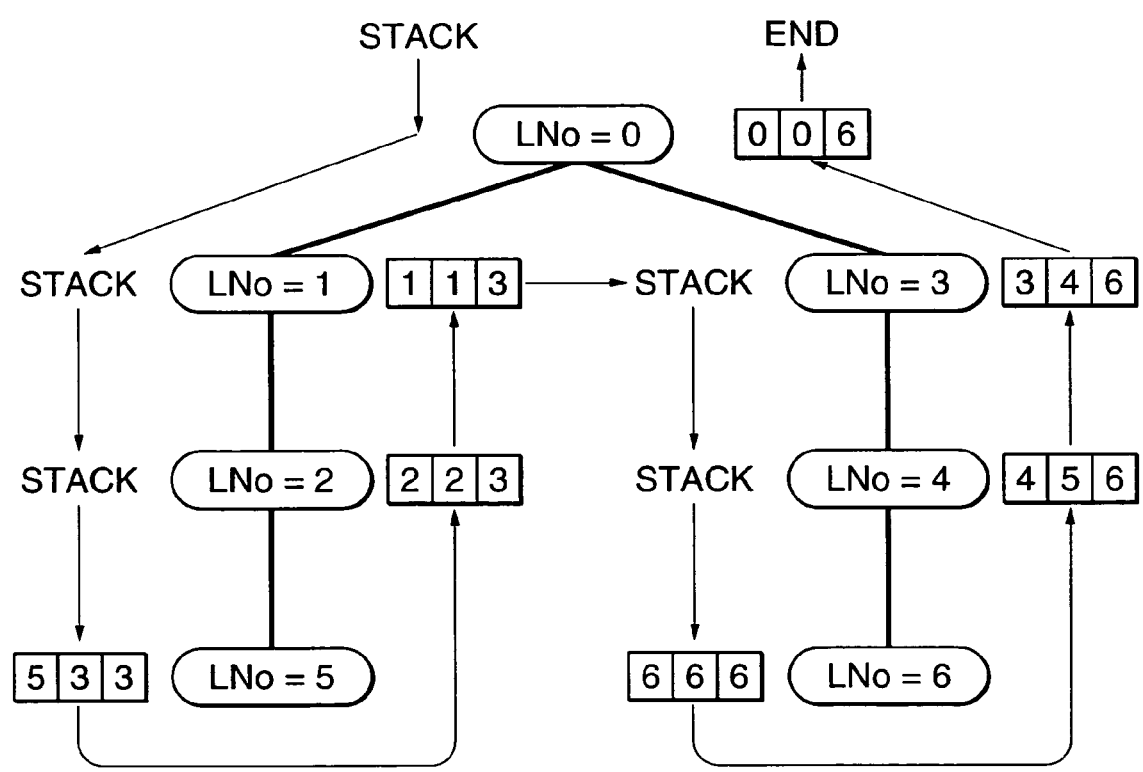
FIG. 13 illustrates a diagram of assistance in explaining an example of a structural information generating process of a partial structure having an editing unit ID of 2.

When such a process is performed, the elements are numbered as the node order searched in the depth-first and left-first order. FIG. 13 illustrate a diagram of assistance in explaining an example of the structural information generating process in a partial structure having an editing unit ID of 2. As shown in FIGS. 10A and 11, an LNo is assigned to each of the elements. The LNo is assigned irrespective of the document structure. Based on the description of XML having an editing unit ID of 2 as shown in FIG. 8A, the process shown in FIG. 12 is executed. Three sets of values enclosed by a rectangle in FIG. 13 are an LNo, a node order, and a maximum node order from the left side.

For LNo=0, 1, and 2, the LNos and the indexes (0, 1, 2) at that point are stacked onto the stack, In the element of the leaf node of LNo=5, LNo=5, node order=3, and maximum node order=3 are stored as structural information. LNo=2 and index=2 are taken out from the stack, and LNo=2, node order=2, and maximum node order=3 are stored as structural information. LNo=1 and index=1 are taken out from the stack, and LNo=1, node order=1, and maximum node order=3 are stored as structural information.

For LNo=3 and 4, the LNos and indexes=4 and 5 are stacked onto the stack. In the element of the leaf node of LNo=6, LNo=6, node order=6, and maximum node order=6 are stored as structural information. LNo=4 and index=5 are taken out from the stack, and LNo=4, node order=5, and maximum node order=6 are stored as structural information. LNo=3 and index=4 are taken out from the stack, and LNo=3, node order=4, and maximum node order=6 are stored as structural information. LNo=0 and index=0 are taken out from the stack, and LNo=0, node order=0, and maximum node order=6 are stored as structural information.

FIGS. 14A to 14D illustrate diagrams of assistance in explaining of a specific example of structural information and version table. The abovementioned process can obtain the structural information as shown in FIGS. 14A to C for each of the partial structures. Particularly, in the partial structure having an editing unit ID of 2, the process detailed using FIG. 13 can obtain the structural information as shown in FIG. 14C. In FIGS. 14A to 14D, the structural information is expressed in a table form. These data pieces are stored into the field in the record in a binary format, and are provided with a cluster ID so as to be registered into the relational database 13. As shown in FIG. 14D, a record of the version information corresponding the cluster ID with the editing unit ID for each version is generated for each of the partial structures, and is registered into the relational database 13.

As explained above, the structured document shown in FIGS. 5A and 5B is decomposed into partial structures as shown in FIGS. 6A and 6B to FIGS. 8A and 8B. Global structural information showing a relation between partial structures, element information which stores information of each element, structural information showing a relation between elements in a partial structure, and a version table for editing are generated and registered into the relational database 13.

A document is edited for each of its partial structures. The partial structure after editing is inputted to the file management unit 2, and then, the dispatcher 3 sends it to the editing unit processing unit 8. In the editing unit processing unit 8, the document analyzing unit 9 analyzes the sent partial structure after editing, and then, the difference analyzing unit 10 extracts a difference between the partial structure after editing and the partial structure before editing registered into the relational database 13 based on the analyzing result. For the element after being changed by addition or editing, element information having new version information as added version information is generated and registered into the relational database 13. For the element before being changed by deletion or editing, the version information immediately before editing is written as deleted version information into the field. The structural information of the edited partial structure is restructured and is provided with a new cluster ID so as to be registered into the relational database 13. A record of the corresponding version table is generated so as to be registered into the relational database 13.

It is thus possible to perform version management when editing is added. With such version management, in the element information of the newest version document, a record in which the deleted version is NULL may be taken out and can easily take out the newest version document or partial structure. The present invention may be naturally configured without performing such version management. In this case, the data structure can be simplified.

Document structure searching will be described with a specific example. When performing the document structure searching, it is considered to set its search condition of a document structure in which an element having a certain attribute exists below an element having a certain attribute. Document structure searching under such a search condition is considered here. By way of example, there will be explained an operation for determining a set in which one element included in a set A of elements satisfying an element attribute condition a $\{ai|1 \leq i \leq Na\}$ (where Na is the number of elements satisfying the attribute condition a, and is hereinafter referred to as $\{ai\}$) has, as the descendant, any one or more elements of a set B of elements satisfying an element contents condition b $\{bj|1 \leq i \leq Nb\}$ (where Nb is the number of elements satisfying the attribute condition b, and is hereinafter referred to as $\{bj\}$). The set A $\{ai\}$ of elements satisfying the element attribute condition a and the set B $\{bj\}$ of elements satisfying the element contents condition b can be easily determined by searching with the filed of the attribute value the element information such as the node table shown in FIG. 10A and the text table shown in FIG. 11.

Figure 15:
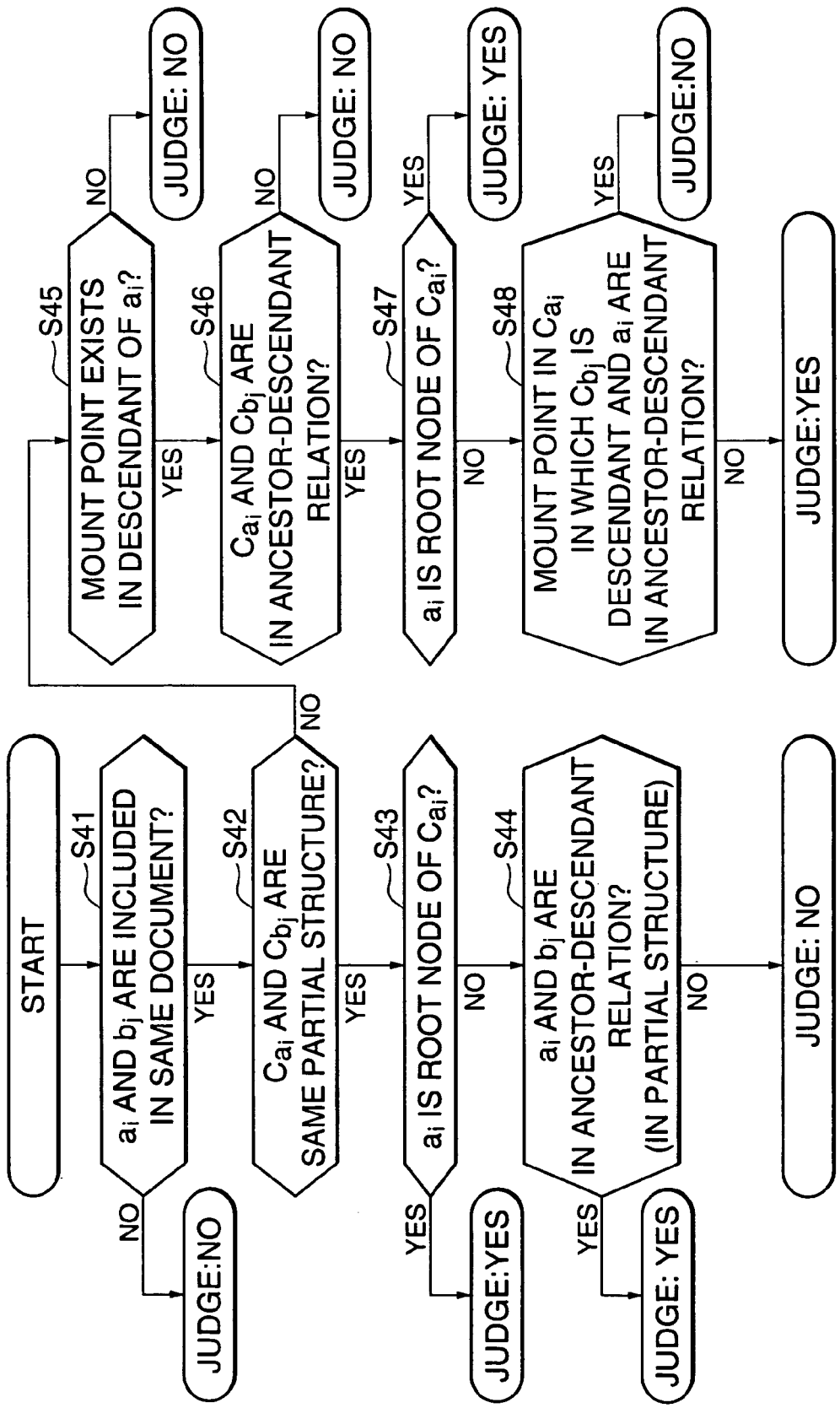
FIG. 15 illustrates a flowchart showing an example of a search process of an ancestor-descendant relation between two elements according to an embodiment of the present invention.

FIG. 15 illustrates a flowchart showing an example of a search process of an ancestor-descendant relation between two elements according to an embodiment of the present invention. It shows a process for judging an ancestor-descendant relation between one element ai included in the set A $\{ai\}$ and one element bj included in the set B $\{bj\}$. A partial structure including the element ai is Cai, and a partial structure including the element bj is Cbj. For the element ai, whether or not the element ai is an element which is a root is found in the partial structure Cai including the element ai.

In S41, whether the element ai and the element bj are included in the same document or not is judged. The judgment may compare the document IDs in the element information. When they are included in different documents, they are judged not to be in an ancestor-descendant relation without performing the later process. For example, when the element bj is sorted in ascending order for each of the document IDs, the element ai and the later element bj are judged not to be in an ancestor-descendant relation when the document ID of the element bj is above the document ID of the element ai, so that the process can be terminated. The element bj may be sorted in descending order, and when the document ID of the element bj is below the document ID of the element ai, the process can be terminated likewise.

When the elements ai and bj are included in the same document, in S42, it is judged whether or not the partial structure Cai including the element ai and the partial structure Cbj including the element bj are the same partial structure. The judgment can be performed by judging whether the cluster IDs of the partial structures Cai and Cbj correspond with each other or not. When the partial structures Cai and Cbj are identical, the elements ai and bj are elements in the same partial structure. In this case, an ancestor-descendant relation between the elements ai and bj may be judged in the partial structure.

In S43, whether the element ai is the root node of the partial structure Cai or not is judged. When the element ai is the root node, the element bj in the same partial structure is essentially the descendant of the element ai. The elements ai and bj are judged to be in an ancestor-descendant relation.

When the element ai is not the root node of the partial structure Cai, an ancestor-descendant relation between the elements ai and bj is judged in S44. In this case, since the elements ai and bj are in the same partial structure, the structural information of the partial structure can be used to judge an ancestor-descendant relation. In the judgment, the node order and maximum node order of the element ai and the node order of the element bj are used. When (the node order of the element ai)<(the node order of the element bj)≦(the maximum node order of the element ai) is established, the element bj can be judged to be the descendant of the element ai. When the condition is not satisfied, the element bj can be judged not to be the descendant of the element ai.

When the partial structure Cai including the element ai and the partial structure Cbj including the element bj are different partial structures, an ancestor-descendant relation of the partial structures Cai and Cbj is checked basically, and then, a relation between the element ai and the mount point in the partial structure Cai is checked. In S45, the mount point number of the element ai is checked. When the mount point number is 0, it is apparent that the descendant of the element ai does not exist in the lower partial structure. The elements ai and bj can be judged not to be in an ancestor-descendant relation at this point. The judgment can make the process faster. Also in this case, the element ai and none of the elements bj not included in the partial structure Cai are in an ancestor-descendant relation. In searching the element ai, the element bj of the set B not included in the partial structure Cai needs not to be searched, and a flag may be set.

When the mount point number of the element ai is not 0, an ancestor-descendant relation between the partial structures Cai and Cbj is checked in S46. Referring to the global structural information, a GID and a maximum GID of the partial structure Cai and a GID of the partial structure Cbj are acquired, and (GID of Cai)<(GID of Cbj)≦(maximum GID of Cai) is judged. When the condition is established, the partial structures Cai and Cbj can be in an ancestor-descendant relation. When the condition is not established, the partial structures Cai and Cbj are not in an ancestor-descendant relation, whereby the elements ai and bj are judged not to be in an ancestor-descendant relation. When the partial structures Cai and Cbj are not in an ancestor-descendant relation, a flag that the set B included in the partial structure Cbj need not to be searched may be set for all the elements of the set A included in the partial structure Cai. The unnecessary search process need not be performed so as to make the processing faster.

When the partial structures Cai and Cbj are in an ancestor-descendant relation, a relation between the element ai and the mount point of the partial structure Cai is checked. In order to release the throughput, whether the element ai is the root node of the partial structure Cai or not is judged in S47. When the element ai is the root node, the element ai is essentially the ancestor of all the elements included in the partial structure below the partial structure Cai. When the partial structures Cai and Cbj are in an ancestor-descendant relation and the element ai is the root node of the partial structure Cai, the elements ai and bj are judged to be in an ancestor-descendant relation.

In S48, a relation between the element ai and the mount point in the partial structure Cai is checked. A path from the partial structure Cbj to the partial structure Cai is traced, and a mount point located on the path in the partial structure Cai corresponding to the root node of a partial structure just below the partial structure Cai is determined to acquire a node order (m) of the mount point. This process can be performed using the global structural information. The parent GID is traced from the partial structure Cbj, and when the parent GID becomes the GID of the partial structure Cai, the partial structure is a partial structure just below the partial structure Cai. A parent connection ID value in the global structural information of the partial structure just below the partial structure Cai can be acquired to determine a mount point in the partial structure Cai. A node order can be acquired from the element information and the structural information of the mount point.

It is judged whether or not a relation between the node order and maximum node order of the element ai and the node order m of the mount point satisfies (the node order of the element ai)≦m≦(the maximum node order of the element ai). When the condition is satisfied, the element ai and the mount point are in an ancestor-descendant relation, whereby the elements ai and bj can be judged to be in an ancestor-descendant relation. When the condition is not satisfied, the element ai and the mount point are not in an ancestor-descendant relation, whereby the elements ai and bj can be judged not to be in an ancestor-descendant relation. In addition, when the condition is not satisfied, a flag that the element of the set B included in the partial structure Cbj need not be searched may be set in searching of the element ai. The search process can be faster.

The abovementioned process is a process for judging an ancestor-descendant relation when the elements ai and bj are specified. Such a process is performed to a certain element ai in the set A with respect to the respective elements bj in the set B. When selecting the element bj, the elements which set a flag for unnecessary searching in S45, S46, and S48 are removed from the searched target. The search process can thus be faster.

The element in the set A may be changed and judged with the elements in the set B likewise. Also at this time, by considering the flag in S46, the search process can be faster.

As the search result, for example, when the search condition is whether or not a document structure in which an element having a certain attribute exists below an element having a certain attribute exists, the result shows only whether it exists or not. In this case, when an ancestor-descendant relation is confirmed between two elements, the process can be terminated. In addition, in the case of searching the entity of a document structure in which an element having a certain attribute exists below an element having a certain attribute, the element of the set A satisfying the condition, the partial structure including the element, or the document ID including the element may be the search result.

With the specific example described in FIGS. 5A and 5B or later, some examples of the abovementioned search process will be explained. FIGS. 16A to 16C and 17A to 17C respectively illustrate diagrams of assistance in explaining an example of a specific operation in an example of the search process of an ancestor-descendant relation between two elements. In the drawings, only element parts related to the description are shown. The case of searching a document structure having an element of text below the element having attribute SECTION is shown in FIG. 16A. In this case, the element having attribute SECTION is the element of SNo=9. The text is the element of SNo=20. From FIGS. 10A and 11, both the elements are found to have an editing unit ID of 2 and belong to the same partial structure (the editing unit ID=2, GID=2). The element of SNo=9 is the root node of the partial structure. In S43, the two elements are judged to be in an ancestor-descendant relation.

The case of searching a document structure having an element of a text below the element having attribute DOCITEM is shown in FIG. 16B. In this case, the element having attribute DOCITEM is the element of SNo=12. The text is the element of SNo=20. From FIGS. 10A and 11, both the elements have an editing unit ID of 2, and belong to the same partial structure (the editing unit ID=2, GID=2). The element of SNo=12, however, is not the root node of the partial structure. For this reason, an ancestor-descendant relation between the elements of SNo=12 and SNo=20 is judged in S44. In other words, from the element information shown in FIGS. 10A and 10B, LNo of SNo=12 is 3, and from the structural information of the editing unit ID=2 shown in FIG. 14C, the node order is 4, and the maximum node order is 6. Similarly, from the element information (text table) shown in FIG. 11, LNo of SNo=20 is 6, and from the structural information of the editing unit ID=2 shown in FIG. 14C, the node order is 6. The node order=6 of the element of SNo=20 is within the range of the node order=4 and the maximum node order=6 of the element of SNo=12. The elements having SNo=12 and SNo=20 are judged to be in an ancestor-descendant relation.

The example shown in FIG. 16C shows the case of searching a document structure having an element of text below the element having attribute CHAPTER. In this case, from the searching of the element information shown in FIGS. 10 and 11, the element having attribute CHAPTER is the element having SNo=6 belonging to the partial structure of GID=1 (the editing unit ID=1). The text is the element having SNo=20 belonging to the partial structure of GID=2 (the editing unit ID=2). Both belong to different partial structures. From the node table shown in FIG. 10A, the element of SNo=6 has the mount point number of 1, and the mount point exists in the descendant. From the global structural information shown in FIGS. 9A and 9B, the partial structures having GID=1 and GID=2 are in an ancestor-descendant relation. With these judgments, the routine is advanced to S47. The element of SNo=6 is the root node of the partial structure of GID=1. The element of SNo=6 belonging to the partial structure of GID=1 and the element of SNo=20 belonging to the partial structure of GID=2 are judged to be in an ancestor-descendant relation.

The example shown in FIG. 16D shows the case of searching a document structure having an element having attribute DOCITEM below the element having attribute PART. In this case, from the searching of the element information shown in FIGS. 10 and 11, the element having attribute PART is the element of SNo=3 belonging to the partial structure of GID=0 (the editing unit ID=0). The element having attribute DOCITEM is the element of SNo=12 belonging to the partial structure of GID=2 (the editing unit ID=2). From the element information, the editing unit IDs of both are different, and both belong to different partial structures. In addition, from the element information, the mount point number of the element of SNo=3 is 1, and the mount point is found to exist in the descendant. The partial structures of GID=0 and GID=2 are found to be in an ancestor-descendant relation with reference to the global structural information. The element of SNo=3, however, is not the root node of the partial structure of GID=0. The judgment in S48 is thus performed.

In this case, from the parent GID of the global structural information of GID=2, the parent of the partial structure of GID=2 is the partial structure of GID=1. Similarly, from the parent GID of the global structural information of GID=1, the parent of the partial structure of GID=1 is the partial structure of GID=0. The mount point of a partial structure just below the partial structure of GID=0 on the path, that is, the partial structure of GID=0 corresponding to the root node of the partial structure of GID=1 is determined. In other words, when the parent connection ID of the global structural information of GID=1 is acquired, it is "001" and an element having an attribute value of E001 is searched from the element information shown in FIG. 11. The element of SNo=16 is found to be the mount point.

From the element information shown in FIG. 10A, LNo of the element of SNo=3 is 3. Referring to LNo=3 in the structural information of GID=0 shown in FIG. 14A, the node order of the element of SNo=3 is found to be 4, and the maximum node order thereof is found to be 8. Similarly, from the element information shown in FIG. 11, LNo of the element of SNo=16 is 8. Referring to LNo=8 in the structural information of GID=0 shown in FIG. 14A, the node order of the mount point of SNo=16 is found to be 8. The node order=8 of the mount point of SNo=16 is within the range of the node order=4 and the maximum node order=8 of the element of SNo=3. The mount point of SNo=16 and the element of SNo=3 are thus in an ancestor-descendant relation. The element of SNo=3 belonging to the partial structure of GID=0 and the element of SNo=12 belonging to the partial structure of GID=2 are judged to be in an ancestor-descendant relation.

Figure 17A:
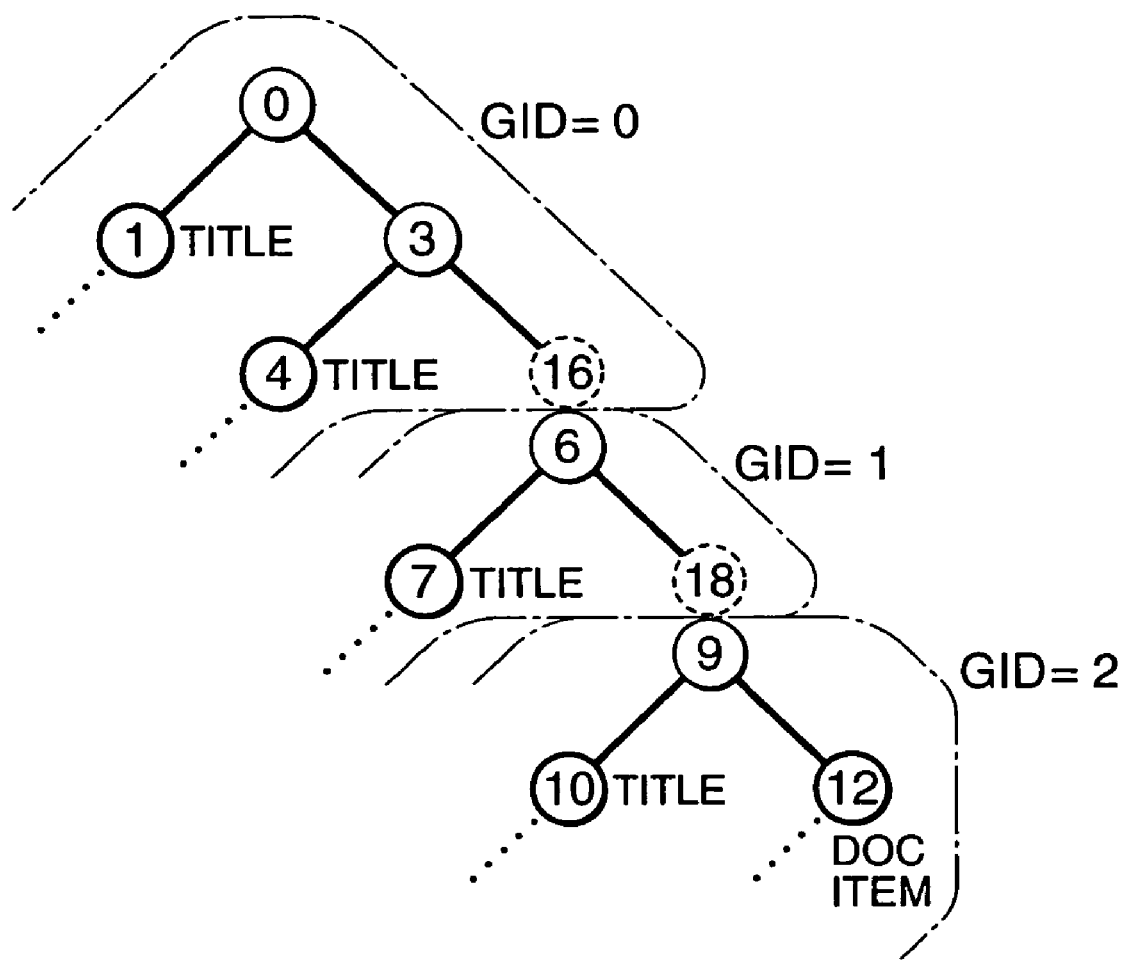

The example shown in FIG. 17A shows the case of searching a document structure having an element having attribute DOCITEM below the element having attribute TITLE. In this case, from the searching of the element information shown in FIGS. 10 and 11, four elements having attribute TITLE are the elements of SNo=1 and SNo=4 belonging to the partial structure of GID=0 (the editing unit ID=0), the element of SNo=7 belonging to the partial structure of GID=1 (the editing unit ID=1), and the element of SNo=10 belonging to the partial structure of GID=2 (the editing unit ID=2). An element having attribute DOCITEM is the element of SNo=12 belonging to the partial structure of GID=2 (the editing unit ID=2).

The elements of SNo=1, 4 and 7 belong to the partial structure different from the element of SNo=12. For the elements of SNo=1, 4 and 7, the mount point number is 0 from the element information shown in FIG. 10A. In S45, an ancestor-descendant relation between the elements of SNo=1, 4 and 7, and the element of SNo=12 is denied.

The element of SNo=10 belongs to the same partial structure (the editing unit ID=2, GID=2) as the element of SNo=12. The element of SNo=10 is not the root node of the partial structure. For this reason, in S44, an ancestor-descendant relation between the elements of SNo=10 and SNo=12 is judged. The node order and the maximum node order corresponding to the element of SNo=10 are 1 and 3 from the structural information having an editing unit ID=2 shown in FIG. 14C. Similarly, the node order to the element of SNo=12 is 4. The node order=4 to the element of SNo=12 is not within the range of the node order=1 and the maximum node order=3 corresponding to the element of SNo=10. An ancestor-descendant relation between the elements of SNo=10 and SNo=12 is denied.

In the specific example explained in FIGS. 5A and 5B or later, an ancestor-descendant relation is not denied in S46 and S48 of FIG. 15, but may be denied in the case of the document structure as shown in FIGS. 2A and 2B. FIG. 17B shows the case of searching a document structure having an element having attribute "CHART" below the element having attribute "CHAPTER TITLE". The details thereof are omitted in the following explanation. The element of SNo=2 is searched as the element having attribute "CHAPTER TITLE", and the element of SNo=12 is searched as the element having attribute "CHART". The two elements are respectively included in the partial structures of GID=0 and GID=2, and are found to be included in the different partial structures. The mount point exists below the element of SNo=2. The partial structures of GID=0 and GID=2 are in an ancestor-descendant relation. The judgment of S48 of FIG. 15 is performed. The mount point corresponding to the root node of the partial structure of GID=2 is the element of SNo=14, and the mount point and the element of SNo=2 are not in an ancestor-descendant relation. An ancestor-descendant relation between the elements of SNo=2 and SNo=12 is denied.

The example shown in FIG. 17C shows the case of searching a document structure having an element having attribute "CHART" below the element having attribute "TITLE" in the document structure shown in FIGS. 2A and 2B. The detailed description thereof is omitted. The element of SNo=3 is searched as the element having attribute "TITLE", and the element of SNo=12 is searched as the element having attribute "CHART". The two elements are included in the partial structures of GID=1 and GID=2 and are found to be included in the different partial structures. In this example, no mount point exists below the element of SNo=3. In the judgment of S45, an ancestor-descendant relation between the elements of SNo=3 and SNo=12 is denied. If the mount point exists below the element of SNo=3, the partial structures of GID=1 and GID=2 are not in an ancestor-descendant relation. In the judgment of S46, an ancestor-descendant relation between the elements of SNo=3 and SNo=12 is denied.

As described above, a structured document is decomposed into partial structures, and global structural information showing a relation between the partial structures and structural information showing a relation between elements in the partial structure are retained. When document structure searching is performed as described above, a process for judging an ancestor-descendant relation between two elements can be conducted fast.

The abovementioned search process explanation does not include a document version. For example, a condition related to the version is added as the search condition. Document structure searching to a given version can be done. The specific example of the abovementioned search process shows an example of a search process in accordance with the data structure shown in FIGS. 4A to 4D. The data structure shown in FIGS. 4A to 4D is one specific example, and other data structures can be applied. For the search process in this case, a given search method can be applied in the scope of not deviating from the purpose of the present invention.

The abovementioned embodiment shows a configuration for managing and structuring information on the structure by the global structural information showing a relation between partial structures and the structural information showing a relation between elements. Further, the present invention is applied to global structural information divided into multiple stages. A configuration so as to search a large-scale structured document fast is thus possible.

As apparent from the abovementioned explanation, according to the present invention, a structured document is decomposed into partial structures so as to retain first structural information (global structural information) showing a relation between the partial structures and second structural information (structural information) showing a relation between elements in the partial structure. For example, when a document is edited for each of the partial structures, the influence of the editing can be retained in the partial structure. For this reason, when the document is edited for each of the partial structures, plural persons can edit it at the same time, and a cooperative editing environment can be supplied. In addition, restructuring of the structural information due to the editing can be retained in the partial structure, whereby time to require for restructuring of the structural information can be shortened.

Document structure searching frequently performed to a structured document can be executed in such a manner that judgment of an ancestor-descendant relation between two elements is performed only by judging an ancestor-descendant relation between partial structures, and judging an element in the ancestor partial structure and a mount point. The process for tracing elements one by one as in the related art can be simplified. An ancestor-descendant relation between two elements can be judged fast so as to make the document structure searching fast.

The entire disclosure of Japanese Patent Application No. 2001-255016 filed on Aug. 24, 2001 including specification, claims, drawings act is incorporated herein by reference in its entirety.

What is claimed is:

1. A search device for determining an ancestor-descendant relationship between a first element and a second element of a structured document, comprising:
   an information retaining part that retains:
      first structural information showing a hierarchical relationship between partial structures, the partial structures obtained by decomposing the structured document in accordance with a setting; and
      second structural information showing, for each of the partial structures, a hierarchical relationship between elements in that partial structure, each ancestor partial structure containing at least one element that is also a root of a child partial structure; and
   a structure search part that determines an ancestor-descendant relationship between the first elements and the second element of the structured document by:
      determining whether the two elements are in a same partial structure;
      if the two elements are in the same partial structure, determining the ancestor-descendant relationship between the two elements based on the second structural information;
      if the two elements are not in the same partial structure, determining the ancestor-descendant relationship between a first partial structure containing the first element and a second partial structure containing the second element based on the first structural information;
      determining if the first partial structure is an ancestor of the second partial structure based on the first structural information; and
      if the first partial structure is an ancestor of the second partial structure, determining an ancestor-descendant relationship between the first element and a mount point based on the second structural information, the mount point contained within the first partial structure, the mount point located on a path from the first partial structure to the second partial structure, and the mount point a root of a child partial structure of the ancestor partial structure.

2. The search device according to claim 1, wherein, if the first element is the root of the first partial structure the structure search part does not determine an ancestor-descendant relationship between the first element and the mount point based on the second structural information.

3. A search method for determining an ancestor-descendant relationship between a first element and a second element of a structured document, comprising:

retaining first structural information showing a hierarchical relationship between partial structures, the partial structures obtained by decomposing the structured document in accordance with a setting; and retaining second structural information showing, for each of the partial structures, a hierarchical relationship between elements in that partial structure, each ancestor partial structure containing at least one element that is also a root of a child partial structure; and determining an ancestor-descendant relationship between the first elements and the second element of the structured document by:

determining whether the two elements are in a same partial structure;

if the two elements are in the same partial structure, determining the ancestor-descendant relationship between the two elements based on the second structural information;

if the two elements are not in the same partial structure, determining the ancestor-descendant relationship between a first partial structure containing the first element and a second partial structure containing the second element based on the first structural information;

determining if the first partial structure is an ancestor of the second partial structure based on the first structural information; and if the first partial structure is an ancestor of the second partial structure, determining an ancestor-descendant relationship between the first element and a mount point based on the first second information, the mount point contained within the first partial structure, the mount point located on a path from the first partial structure to the second partial structure, and the mount point a root of a child partial structure of the ancestor partial structure.

4. The search method according to claim 3, wherein, if the first element is the root of the first partial structure, an ancestor-descendant relationship between the first element and the mount point based on the second structural information is not determined.

* * * * *